(12) United States Patent
Claus

(10) Patent No.: US 11,081,865 B2
(45) Date of Patent: Aug. 3, 2021

(54) DEVICE FOR SETTING THE ELECTRODE GAP ON A SPARK PLUG

(71) Applicant: Robert Bosch GmbH, Stuttgart (DE)

(72) Inventor: Nicolai Claus, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/497,676

(22) PCT Filed: Mar. 7, 2018

(86) PCT No.: PCT/EP2018/055531
§ 371 (c)(1),
(2) Date: Sep. 25, 2019

(87) PCT Pub. No.: WO2018/177700
PCT Pub. Date: Oct. 4, 2018

(65) Prior Publication Data
US 2020/0036167 A1 Jan. 30, 2020

(30) Foreign Application Priority Data
Mar. 29, 2017 (DE) .................... 10 2017 205 285.6

(51) Int. Cl.
*H01T 21/06* (2006.01)
*H01T 21/02* (2006.01)

(52) U.S. Cl.
CPC ............ *H01T 21/06* (2013.01); *H01T 21/02* (2013.01)

(58) Field of Classification Search
CPC ......... B60J 7/1642; H01T 21/02; H01T 21/06
See application file for complete search history.

(56) References Cited

U.S. PATENT DOCUMENTS

| 2,549,165 | A | * | 4/1951 | Brackenbury | .......... H01T 21/06 72/31.12 |
| 2,645,142 | A | | 7/1953 | Schwenzfeier et al. | |
| 2,670,643 | A | | 3/1954 | Clark | |
| 3,898,829 | A | * | 8/1975 | Sydow | .................... H01T 13/24 72/125 |
| 4,070,898 | A | | 1/1978 | Earle | |
| 5,282,303 | A | * | 2/1994 | Schriever | ............. A41H 37/006 269/149 |

FOREIGN PATENT DOCUMENTS

| DE | 102011013657 A1 | 9/2012 |
| SU | 1720116 A1 | 3/1992 |

OTHER PUBLICATIONS

International Search Report for PCT/EP2018/055531, dated May 28, 2018.

* cited by examiner

*Primary Examiner* — Joseph L Williams
(74) *Attorney, Agent, or Firm* — Norton Rose Fulbright US LLP; Gerard Messina

(57) ABSTRACT

An apparatus for setting a gap between a first electrode and a second electrode of a spark plug, encompassing at least a counter-brace, a gap plate, and a plunger, which are disposed along a longitudinal axis; the counter-brace being configured to brace the spark plug; the gap plate being disposed between the counter-brace and the plunger in the direction of the longitudinal axis; the gap plate being configured to be disposed between the first electrode and the second electrode; and the plunger being configured to apply a deformation force in the direction of the longitudinal axis onto the second electrode.

5 Claims, 3 Drawing Sheets

DEVICE FOR SETTING THE ELECTRODE GAP ON A SPARK PLUG

FIELD OF THE INVENTION

The present invention relates to an apparatus and a method for setting the gap between a first electrode and a second electrode of a spark plug.

BACKGROUND INFORMATION

Spark plugs are known from the existing art in a variety of configurations and are used, for example, to ignite a mixture of fuel and oxygen. Demands on spark plugs in terms of robustness, strength, temperatures, and operating hours are becoming greater, which is leading to new challenges in the development of spark plugs. Demands on spark plugs have become greater especially in the field of industrial gas engines, and up to 6,000 operating hours, or more, are required.

The service life of a spark plug is determined by the resistance of the electrode material to corrosion and erosion. The ignition spark plasma, and oxidation of the electrode surfaces, result in a widening of the electrode gap, which ultimately leads to failure of the spark plugs. Noble-metal alloys, usually made of platinum or iridium, are used in order to improve the resistance of the electrodes to corrosion and erosion. The wear on the electrodes of the spark plugs is determined principally, however, by the electrode surface which forms under operating conditions during sparking, and which depends on interaction with the spark plasma and with the combustion-chamber atmosphere.

Because of the high cost of a spark plug (in particular spark plugs of an industrial gas engine) and the large number of spark plugs in a working engine of this kind, it is more cost-effective to reset the electrode gap than to replace the spark plugs after a predefined number of operating hours.

The gap between the first electrode and the second electrode is set manually by an operator, by example using pliers or an impact tool, and this process is thus laborious, time-consuming, and susceptible to error. In particular, impacts on electrodes can lead to breaks in the noble-metal welds or the ceramic insulation, and can thus shorten service life or destroy the spark plug. One of the electrodes can also be pushed into the insulator, thereby destroying the spark plug.

The gap between the first and the second electrode, and the overlap of the electrodes, are often inaccurate after being set, so that spark plugs having electrode gaps set in that manner require short maintenance intervals and exhibit a shortened service life. The time-consuming setting of the electrode gap furthermore results in long down times for the industrial gas engine, and thus in considerable production outages.

SUMMARY OF THE INVENTION

The apparatus according to the present invention for setting the gap between a first electrode and a second electrode of a spark plug, conversely, has the advantage that the gap between the first electrode and the second electrode of the spark plug can be set, independently of an operator, exactly and reproducibly within a very short time. The down time of the working engine can thereby be minimized, and productivity can be increased. Furthermore, utilization of an apparatus according to the present invention makes it possible to prevent the spark plugs from being damaged or destroyed in the context of setting of the gap between the electrodes due to excessive deformation forces. According to the present invention, this is achieved by the apparatus in such a way that the apparatus encompasses at least a counter-brace, a gap plate, and a plunger; the counter-brace being configured to brace the spark plug along a longitudinal axis oppositely to an advance direction; the gap plate being disposed between the counter-brace and the plunger; the gap plate being configured to be positioned between the first electrode and the second electrode; and the plunger being configured to apply a deformation force in the advance direction onto the second electrode. The plunger consequently presses the electrode in a direction toward the first electrode, the gap between the first and the second electrode being predefined by the gap plate and thus being reproducible. In the correctly set state, the first and the second electrode thus abut against the gap plate.

The further described embodiments present further refinements of the invention.

Also, the plunger may have a force limiter by which the maximum deformation force that acts on the second electrode can be limited. The force limiter may be positioned for this purpose between the plunger and a plunger drive system. Excessive deformation forces can result, for example, in breakage of a weld by which the second electrode is connected to a spark plug housing. Upon deformation of the second electrode, the latter is pressed via the gap plate against the first electrode; if the deformation forces are too great, an insulator between the first and the second electrode can be destroyed, or the first electrode can be pushed into the insulator.

The plunger may be driven by a lever mechanism or by a linear drive system, in particular by a spindle drive, with the result that the apparatus can be actuated manually by an operator. The lever mechanism can have a handle that is drivingly coupled to the plunger by way of one or several lever rods, so that a pivoting motion of the handle causes an advance of the plunger along the longitudinal axis. The lever mechanism can furthermore be embodied in the manner of a toggle lever, the result being on the one hand that the maximum advance travel is limited, and on the other hand that a large deformation force can be applied to the second electrode. Alternatively to the lever mechanism, linear drive systems in various configurations can be used, for example manually or mechanically driven linear drive systems, hydraulic or pneumatic linear drive systems, or spindle drives.

According to a further embodiment, the apparatus has at least one abutment surface by way of which the alignment of the spark plug around the longitudinal axis is predefined. Spark plugs typically have, at that end of the spark plug housing which faces away from the electrodes, a hexagonal shape with which the spark plug can be installed using a corresponding tool. The abutment surface may correspond to the spark plug housing or to the hexagon, so that the alignment of the spark plug around the longitudinal axis, and thus also the alignment of the second electrode in the apparatus, is predefined by the abutment surface.

It is moreover particularly advantageous if at least one clip connector is provided, by way of which the spark plug is held in the counter-brace and in the apparatus. The spark plug can thus easily be inserted into the counter-brace and is held in an immobilized manner by the clip connector. This makes possible particularly simple handling by the operator, since the apparatus can be held with a first hand and the apparatus can be actuated with a second hand, with no need for further auxiliary equipment. In addition, the spark plug is protected by the clip connector from damage caused by unintentionally falling out. Alternatively, a receptacle is provided which has at least in part a negative shape of the spark plug that is to be inserted, for instance a shape for the tool application region, in particular a hexagon, of the spark plug.

The counter-brace may be held in a manner mounted movably along the longitudinal axis, and is lockable, by way of a slide, so that even spark plugs having different longitudinal dimensions can be insertable into the apparatus. The slide and/or the abutment surfaces can furthermore be replaceable so that different spark plug housing shapes can be received.

According to a further advantageous embodiment, one or several lugs or at least one groove, by way of which the second electrode is braced perpendicularly to the longitudinal axis in at least one plane in the context of the bending operation, is shaped or machined onto the plunger. The lugs or the groove ensure that the first electrode and the second electrode have an exact overlap after deformation is complete.

Also, the gap plate may be disposed replaceably. Gap plates of different thicknesses can thus be used.

A further aspect of the present invention relates to a method for setting the gap between a first electrode and a second electrode of a spark plug. In a first method step, the spark plug is inserted into a counter-brace of an apparatus, a gap plate being slid between the first electrode and the second electrode. In a second method step, a deformation force is applied by way of a plunger onto the second electrode, and the second electrode is thereby bent toward the first electrode in such a way that the second electrode contacts the gap plate. The spark plug can then be removed from the apparatus. Thanks to the gap plate, a constant gap between the first electrode and the second electrode can always be set even if they are worn away differently.

It is also advantageous if the plunger is driven by a lever mechanism or by a linear drive system. The lever mechanism or the linear drive system makes possible particularly simple and ergonomic operation of the apparatus.

In addition, it is also particularly advantageous if the deformation force of the plunger is limited by way of a force limiter, in order to protect the spark plug from excessive deformation forces.

An exemplary embodiment of the invention will be described in detail below with reference to the appended drawings.

DETAILED DESCRIPTION

An apparatus 2 for setting a gap A between a first electrode 4 and a second electrode 5 of a spark plug 1, in accordance with a first exemplifying embodiment of the invention, will be described in detail below with reference to FIGS. 1 to 3.

Figure 1:
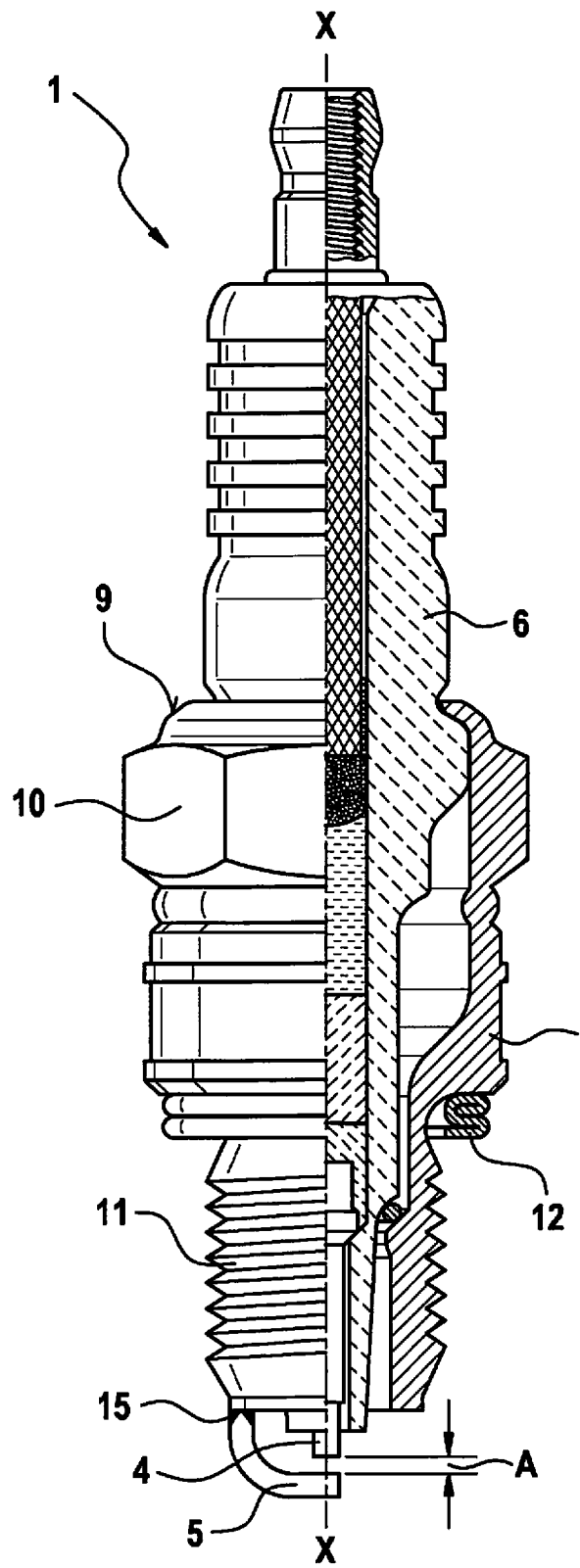
FIG. 1 is a schematic section view of a spark plug.

As is apparent from FIG. 1, spark plug 1 encompasses first electrode 4 and second electrode 5, which are disposed overlappingly and are spaced apart by a gap A in longitudinal axis X-X. First electrode 4, also called a "center electrode," is aligned coaxially on longitudinal axis X-X and is surrounded in an understood manner by a ceramic insulator 6.

Spark plug 1 furthermore encompasses a spark plug housing 3 that is manufactured from a metallic material. Spark plug housing 3 is provided on a region of insulator 6 which is directed toward a combustion chamber 8, and encompasses second electrode 5, an attachment thread 11, an external seal 12, and a hexagon 10. Using hexagon 10, spark plug 1 can be fastened onto a working engine using a suitable tool, for example an open-end wrench, in such a way that external seal 12 closes off the thread gap of attachment thread 11 in an absolutely gas- and liquid-tight manner. That end face of spark plug housing 3 which faces away from second electrode 5 is referred to hereinafter as stop surface 9.

The metallic spark plug housing 3 is electrically conductive. Second electrode 5, also called a "ground electrode," is disposed at that end of spark plug housing 3 which faces toward combustion chamber 8, and is connected thereto by way of a weld 15. Second electrode 5 is L-shaped, so that it is disposed with respect to first electrode 4 overlappingly and with a spacing in longitudinal axis X-X. When spark plug 1 sparks, an arc consequently forms between first electrode 4 and second electrode 5 in the region of longitudinal axis X-X.

As a result of the spark plasma, and due to oxidation of the surfaces of first electrode 4 and second electrode 5, a widening or enlargement of gap A between them occurs, resulting in improper functioning of spark plug 1. In order to reset gap A between first electrode 4 and second electrode 5 after a given operating period, spark plug 1 must be removed from combustion chamber 8 and gap A must be set using apparatus 2.

Figure 2:
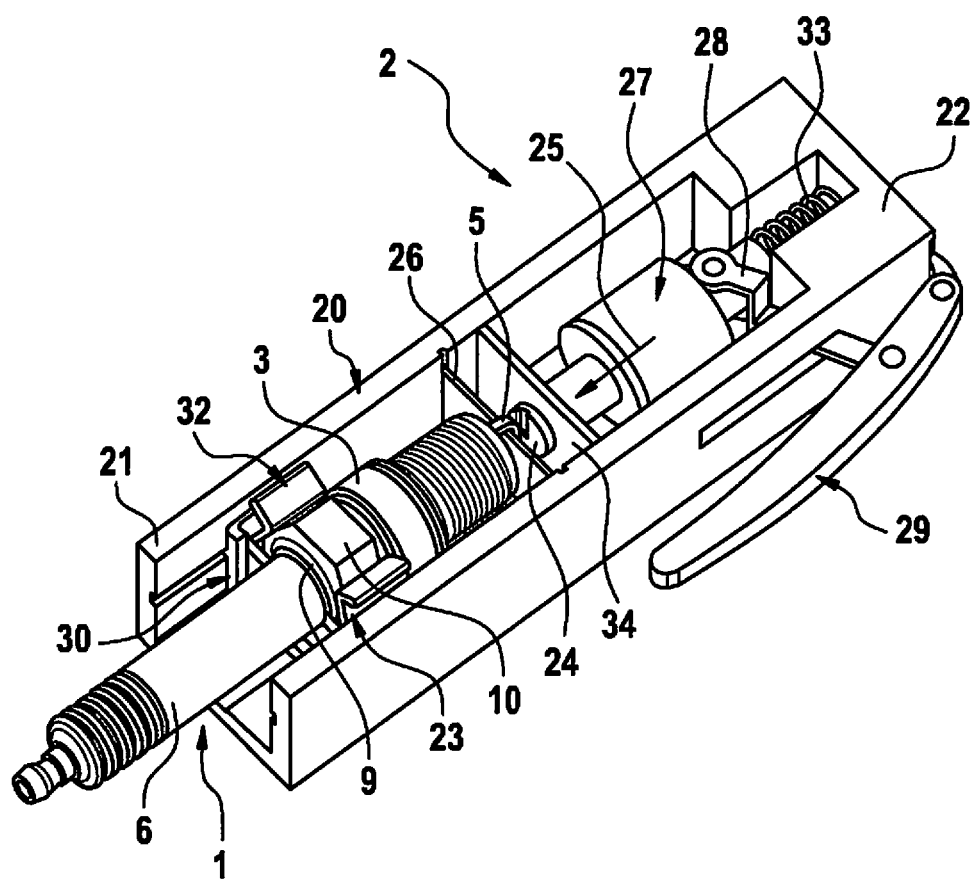
FIG. 2 schematically depicts an apparatus according to the present invention for setting the gap between a first electrode and a second electrode of the spark plug.
Figure 3:
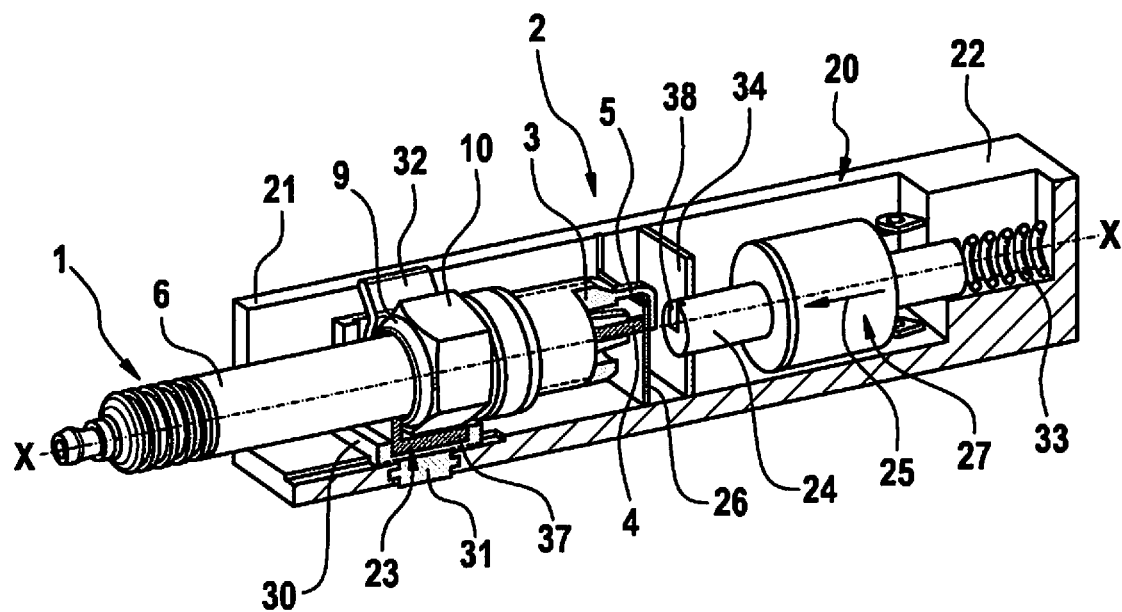
FIG. 3 is a schematic section view of the apparatus in accordance with FIG. 2.

Apparatus 2 for setting gap A between first electrode 4 and second 5 is evident from FIGS. 2 and 3.

Apparatus 2 encompasses a housing 20 having a first exposed end 21 and a second exposed end 22, a counter-brace 23, a gap plate 26, and a plunger 24. Counter-brace 23 is disposed at first exposed end 21 of housing 20, and plunger 24 is disposed at second exposed end 22 and is movable along longitudinal axis X-X of the apparatus, by way of a lever mechanism 28, in an advance direction 25. For that purpose, plunger 24 is mounted by way of a guide 34 movably along longitudinal axis X-X.

Spark plug 1 inserted into apparatus 2 is supported oppositely to advance direction 25 by counter-brace 23 by way of stop surface 9. Spark plug 1 is consequently inserted into apparatus 2 in such a way that first electrode 4 and second electrode 5 are positioned in apparatus 2 on the side facing toward plunger 24, and that side (stop surface 9) of spark plug housing 3 which faces away from the electrodes abuts against counter-brace 23. Also positioned in housing 20 is gap plate 26, which is introduced between first electrode 4 and second electrode 5 upon insertion of spark plug 1.

An abutment surface 37 and a clip connector 32 are also disposed in the region of counter-brace 23; abutment surface 37 and clip connector 32 correspond to the shape of spark plug housing 3 or to hexagon 10, or locally exhibit the negative shape of spark plug housing 3. Abutment surface 37 predefines the alignment of second electrode 5 in apparatus 2, and thereby ensures that second electrode 5 fits optimally around gap plate 26.

Clip connector 32 locks the spark plug in apparatus 2 and protects it from unintentionally falling out. The spark plug is thereby fixedly received in apparatus 2.

Gap plate 26 is manufactured from a pressure-resistant material and has a predefined thickness. The thickness of gap plate 26 predefines gap A between first electrode 4 and second electrode 5 after the setting operation. Gap plate 26 can be replaced depending on gap A that is to be set.

The actuated state of apparatus 2 is evident from FIG. 2. Plunger 24 is moved along longitudinal axis X-X in advance direction 25 by actuation of a handle 29 that is operationally coupled to plunger 24 by way of lever mechanism 28. The deformation force acts via plunger 24 on second electrode 5, with the result that second electrode 5 is bent toward first electrode 4 sufficiently that gap plate 26 between first electrode 4 and second electrode 5 touches both electrodes. After completion of the deformation operation, plunger 24 is moved by a return element 33 back into the initial position. Spark plug 1 can be removed from apparatus 2 by opening clip connector 32.

Spark plug 1 is protected from excessive deformation forces by a force limiter 27 that is disposed between lever mechanism 28 and plunger 24. The maximum axial deformation force acting on spark plug 1 is limited by force limiter 27. Force limiter 27 protects spark plug 1, for example, from having first electrode 4 pressed into insulator 6, or from breakage of weld 15 of second electrode 5.

The unactuated state of apparatus 2 is evident from FIG. 3. A groove can be provided on that side of plunger 24 which faces toward spark plug 1. Upon actuation of apparatus 2, the groove engages locally around second electrode 5. This on the one hand prevents flexural torsion of second electrode 5, and on the other hand corrects improper overlap. The result is to ensure that after deformation, first electrode 4 and second electrode 5 are oriented exactly overlappingly in longitudinal axis X-X. The orientation of the groove corresponds here to the orientation of second electrode 5.

Because of the differing configurations of spark plugs 1, counter-brace 23 is displaceable along longitudinal axis X-X, and held lockably, by way of a slide 30, so that spark plugs 1 having different longitudinal dimensions can be inserted into apparatus 2. To ensure that apparatus 2 is also suitable for different spark plug housings 3, counter-brace 23 and abutment surface 37 may be replaceable. Apparatus 2 can thus be used to set gap A between first electrode 4 and second electrode 5 of spark plugs 1 of all configurations. Slide 30 can be displaced and locked, for example, using a set screw 31. Apparatus 2 can furthermore also be configured in such a way that two or more spark plugs can be set simultaneously.

It is thus possible according to the present invention to furnish an apparatus 2 and a method for setting gap A between first electrode 4 and second electrode 5 of a spark plug 1 which enable reliable and reproducible setting of gap A. During the setting operation, housing 20 of the apparatus can be held in one hand and the lever mechanism can be actuated with the other hand.

What is claimed is:

1. An apparatus for setting a gap between a first electrode and a second electrode of a spark plug, comprising:
   a counter-brace, a gap plate, and a plunger, which are disposed along a longitudinal axis; and
   a lever or a linear drive system to move the plunger in the direction of the longitudinal axis, and
   a force limiter to limit a maximum deformation force of the plunger, wherein the force limiter is disposed between the lever and the plunger,
   wherein the counter-brace is configured to brace the spark plug,
   wherein the gap plate is disposed between the counter-brace and the plunger in the direction of the longitudinal axis,
   wherein the gap plate is configured to be disposed between the first electrode and the second electrode, and
   wherein the plunger is configured to apply a deformation force in the direction of the longitudinal axis onto the second electrode,
   wherein the plunger is moved by actuation of a handle that is operationally coupled to the plunger via the lever or the linear drive system.

2. The apparatus of claim 1, wherein at least one abutment surface, which is configured to predefine the alignment of the spark plug around the longitudinal axis, is provided.

3. The apparatus of claim 1, further comprising:
   at least one clip connector to hold the spark plug in the apparatus, or a receptacle, having at least in part a negative shape of the spark plug, to be inserted.

4. The apparatus of claim 1, wherein the counter-brace is mounted by a slide movably along the longitudinal axis.

5. A method for setting a gap between a first electrode and a second electrode of a spark plug using an apparatus, the method comprising:
   inserting the spark plug into the apparatus, which is for setting the gap between the first electrode and the second electrode of the spark plug, and which includes:
     a counter-brace, a gap plate, and a plunger, which are disposed along a longitudinal axis, wherein the counter-brace is configured to brace the spark plug, wherein the gap plate is disposed between the counter-brace and the plunger in the direction of the longitudinal axis, wherein the gap plate is configured to be disposed between the first electrode and the second electrode, and wherein the plunger is configured to apply a deformation force in the direction of the longitudinal axis onto the second electrode; and
     a lever or a linear drive system, which includes a spindle drive, to move the plunger in the direction of the longitudinal axis, positioning a gap plate between the first electrode and the second electrode; and
   applying a deformation force by a plunger onto the second electrode so that the second electrode contacts the gap plate,
   wherein the plunger is moved by actuation of a handle that is operationally coupled to the plunger via the lever or the linear drive system,
   wherein the deformation force of the plunger is limited via a force limiter, wherein the force limiter is disposed between the lever and the plunger.

* * * * *